United States Patent [19]

Farley et al.

[11] Patent Number: 4,681,013

[45] Date of Patent: Jul. 21, 1987

[54] ROTARY LAUNCHER SYSTEM FOR AN AIRCRAFT

[75] Inventors: Harold C. Farley, Thousand Oaks; Robert G. Boles, North Hollywood, both of Calif.

[73] Assignee: Lockheed Corporation, Calabasas, Calif.

[21] Appl. No.: 799,089

[22] Filed: Nov. 18, 1985

[51] Int. Cl.⁴ .............................................. F41F 3/06
[52] U.S. Cl. .................................. 89/1.815; 89/1.804
[58] Field of Search ................. 89/1.815, 1.804, 1.803, 89/1.802, 1.816, 1.819, 1.8; 244/137 R

[56] References Cited

U.S. PATENT DOCUMENTS

| | | | |
|---|---|---|---|
| 2,447,941 | 8/1948 | Imber et al. | 102/393 |
| 2,646,786 | 7/1953 | Robertson | 89/1.51 X |
| 2,826,120 | 3/1958 | Lang et al. | 89/1.803 |
| 3,228,295 | 1/1966 | Kane | 89/1.802 |
| 4,040,334 | 8/1977 | Smethers, Jr. | 89/1.804 |
| 4,318,328 | 3/1982 | Rona | 89/1.815 |
| 4,333,384 | 6/1982 | Arnold | 89/1.803 |
| 4,409,880 | 10/1983 | Fetterly | 89/1.804 |
| 4,475,436 | 10/1984 | Campbell | 89/1.804 |
| 4,489,638 | 12/1984 | Bastian et al. | 89/1.815 |

*Primary Examiner*—David H. Brown
*Attorney, Agent, or Firm*—Louis L. Dachs

[57] ABSTRACT

The invention is a rotary launcher system for an aircraft having a weapon bay with an opening in communication with the exterior of the aircraft. The system comprises a plurality of doors which are mounted to the aircraft and movable from an open position to a closed position. In the closed position the doors seal off part of the opening and form a portion of the external contour of the aircraft. The rotary launcher is mounted within the weapon bay which includes a frame member rotatively mounted therein. A plurality of weapon mounting assemblies are attached to the frame member at discrete locations and are sequentially alignable with the opening upon rotation of the frame member. Barrier assemblies are mounted to the frame member, which cooperate with the plurality of doors, sealing off the weapon bay from the exterior of the aircraft when any one of the plurality of assemblies is aligned with the opening. Preferably, this system includes at least one cover assembly mounted to the rotary launcher for covering the remaining portion of the opening when at least one of the plurality of missile mounting assemblies is aligned with the opening. The rotary launcher cooperates with the plurality of doors to form a portion of the external contour extending completely over the opening.

6 Claims, 5 Drawing Figures

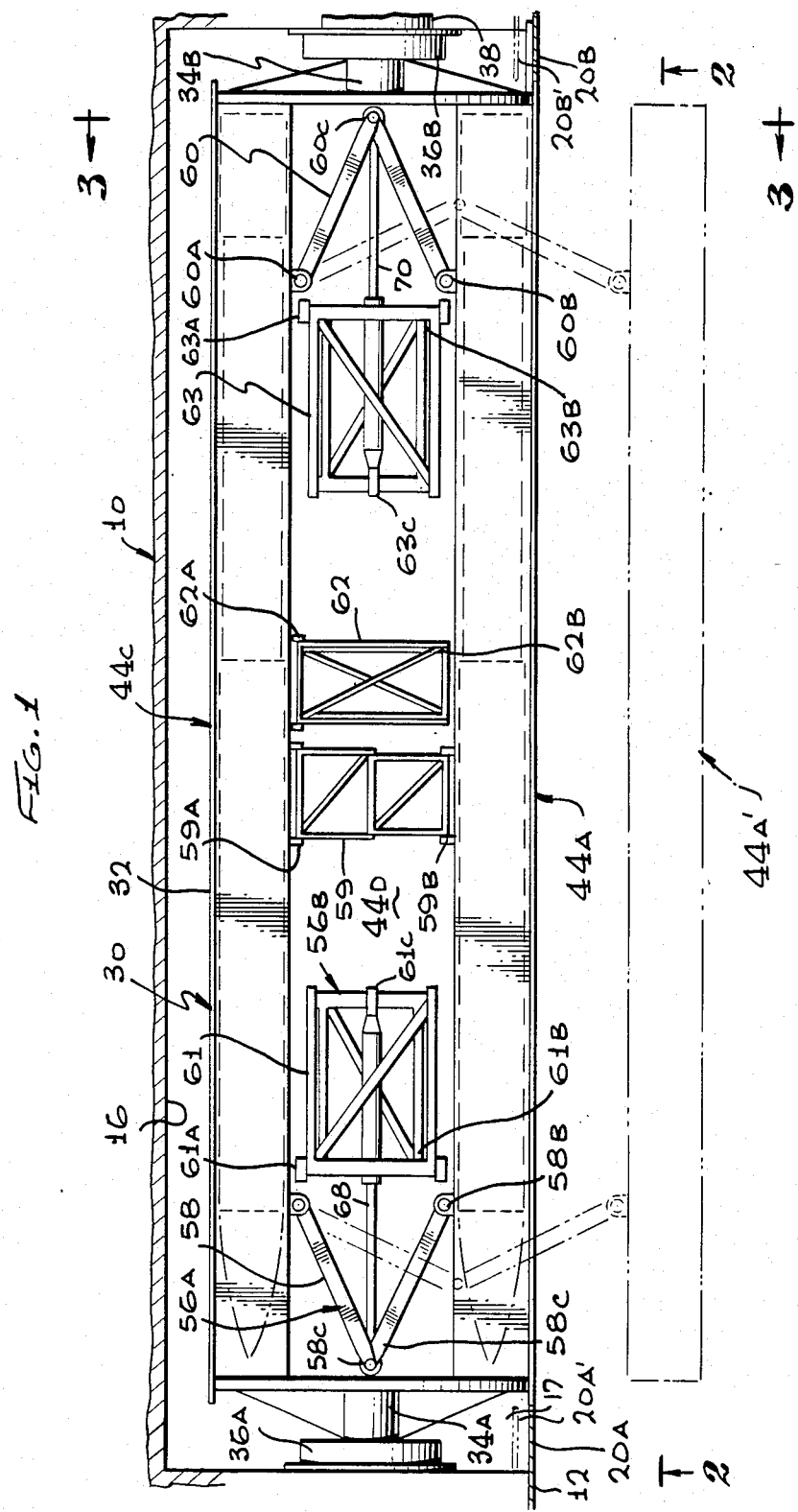

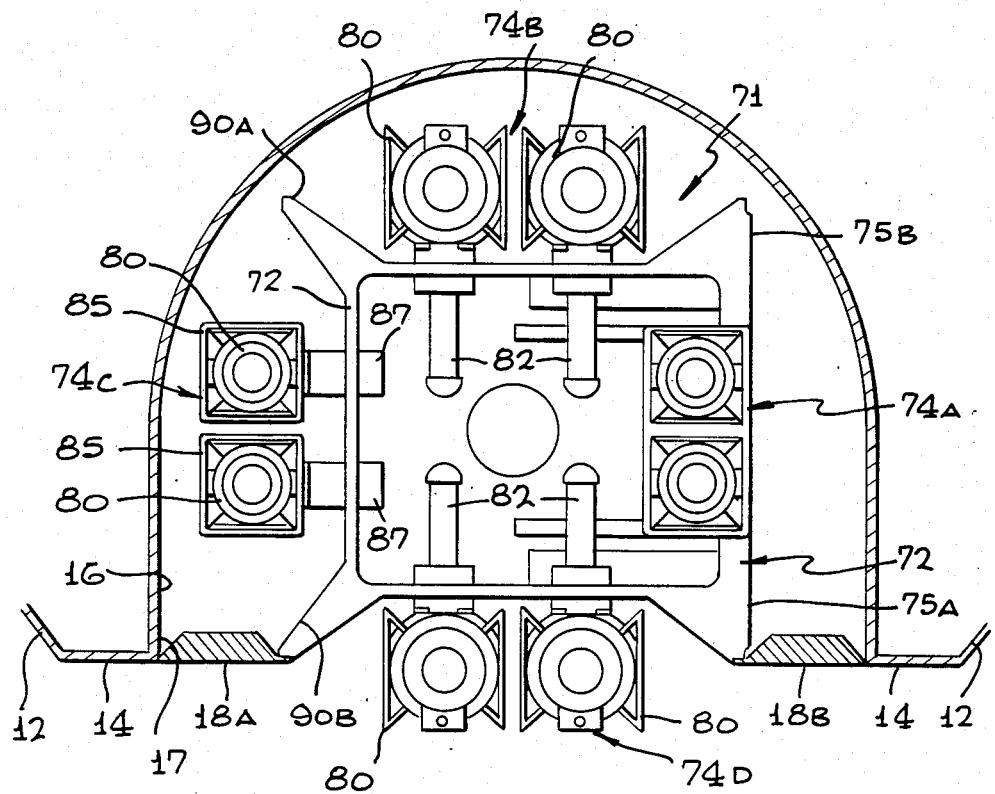
FIG. 5
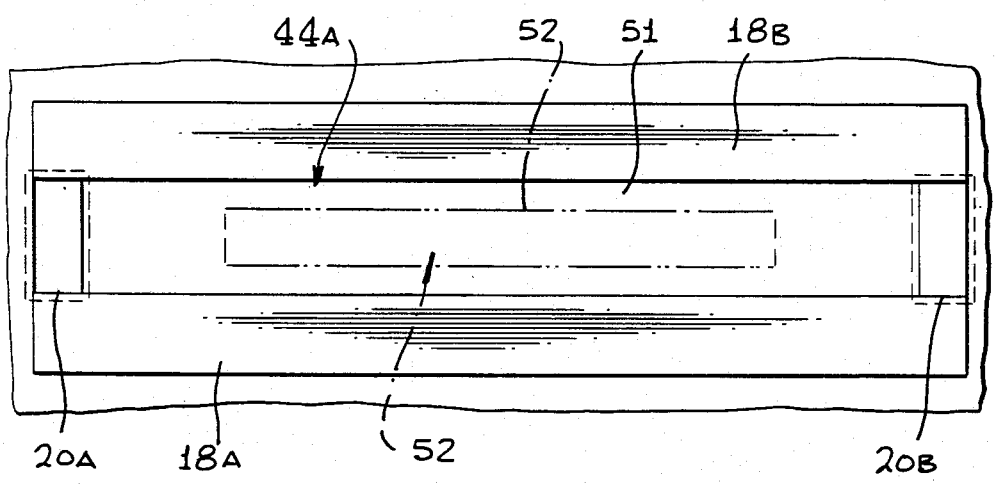
FIG. 2

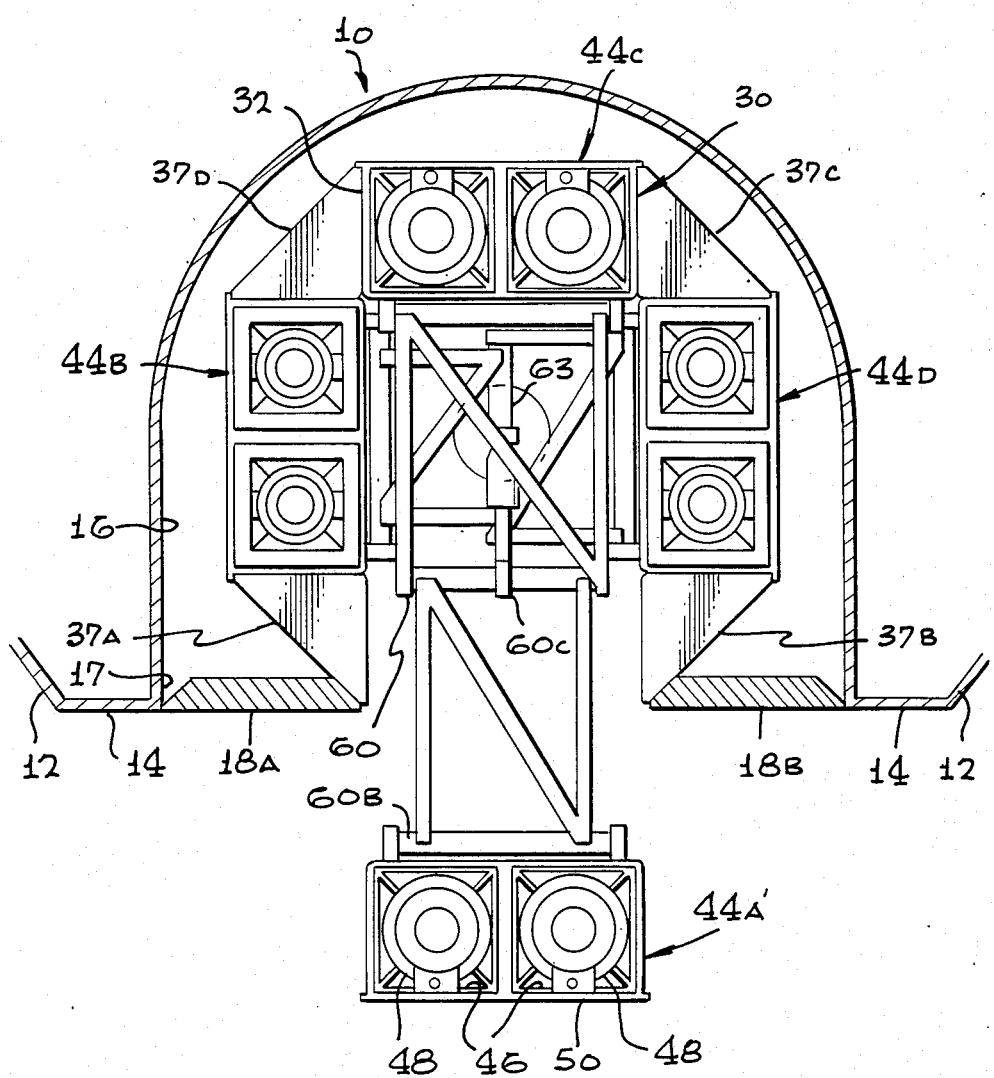

ROTARY LAUNCHER SYSTEM FOR AN AIRCRAFT

TECHNICAL FIELD

The invention relates to the field of weapon dispensing systems and, in particular, to a rotary missile launching system.

BACKGROUND INFORMATION

Rotary missile launchers, as disclosed in U.S. Pat. No. 4,475,436 "Missile Launcher" by D. R. Campbell, provide for the internal storage of a relatively large number of missiles in a confined space and provide the ability to precisely position the weapon for ejection. This layout allows the use of a smaller weapon bay than would be required when using conventional bomb racks. As a result, the opening in the fuselage need only be slightly larger than that of the individual missile. The problem is that even a small opening will allow a considerable amount of air turbulence into the weapon bay, especially if the aircraft is at near sonic or supersonic speeds. The turbulence can cause high structural loads to be placed on the missiles, the launcher itself and any hydraulic and/or electrical equipment located within the weapon bay. Another problem is the dramatic increase in the radar cross-section of the aircraft, along with an increase in aerodynamic drag when the weapon bay doors are open.

Presently existing rotary launchers are built into the aircraft. As a result, missiles have to be loaded one at a time, i.e., the missiles must be attached to the launcher through an opening and hooked-up and then rotated so that the next weapon station on the launcher comes into position. This can be a time consuming operation and may not be suitable for use on a tactical fighter or fighter bomber aircraft which require a rapid turnaround time. Additionally, existing rotary launchers are only designed for use with missiles that are ejected from the aircraft prior to ignition of the rocket motor or jet engine. No provision exists for missiles that must be rail or tube launched. U.S. Pat. No. 4,040,334, "Missile Launcher for Aircraft by R. G. Smithers, Jr., however, does discloses a rotary launcher mounted within an aircraft which aligns a missile with a launch tube exiting the nose of the aircraft. The problem here is that the length of the launch tube must extend from the weapon bay to the nose of the aircraft taking up a considerable amount of space within the aircraft. Thus, such a system is appropriate for a large bomber type aircraft but would be impractical on a small tactical aircraft.

It should also be noted that some early jet fighters incorporated extendable flush mounted pods on the underside of the aircraft which carried small, two to three inch diameter unguided rockets which were typically fired in salvo. Another approach was to incorporate launch tubes in weapon bay doors. Again, the missiles were small in diameter and unguided. The disadvantage of such systems is that the doors are extremely large, increasing the drag and radar cross-section of the aircraft when extended.

Other patents of interest U.S. Pat. No. 4,333,384, "Rotary Rack Launcher with Direct Load Path Suspension" by A. M. Arnold, U.S. Pat. No. 3,228,295, "Guided Missile Launching System" by G. A. Kane et al., U.S. Pat. No. 2,447,941, "Aerial Bombs, Pyrotechnic Devices and the Like" by J. Imber et al., and U.S. Pat. No. 2,646,786, "Cylindrical Object Ejecting Apparatus" by F. H. Robertson.

Therefore, it is a primary object of the subject invention to provide a rotary missile launching system for an aircraft, wherein the rotary launcher can be easily installed and removed from the aircraft increasing the sortie rate of the aircraft.

It is another primary object of the subject invention to provide a rotary missile launching system for an aircraft that provides a barrier which prevents air turbulence from reaching the interior of the weapon bay during missile launching.

It is a further object of the subject invention to provide a missile launching system for an aircraft that does not require the opening of the weapon bay doors to launch a missile.

A still further object of the subject invention is to provide a rotary missile launching system for an aircraft which is capable of ejector launching or launching the missile from within a launching tube.

Another object of the subject invention is to provide a missile launching system that provides a reduced radar cross-section during a missile launch cycle.

DISCLOSURE OF THE INVENTION

The invention is a rotary launcher system for an aircraft having a weapon bay with an opening in communication with the exterior of the aircraft. The system comprises a plurality of doors which are mounted to the aircraft and movable from an open position to a closed position. In the closed position the doors seal off part of the opening and form a portion of the external contour of the aircraft. The rotary launcher is mounted within the weapon bay which includes a frame member rotatively mounted therein. A plurality of weapon mounting assemblies are attached to the frame member at discrete locations and are sequentially alignable with the opening upon rotation of the frame member. Barrier means are mounted to the frame member, which cooperate with the plurality of doors, sealing off the weapon bay from the exterior of the aircraft when any one of the plurality of assemblies is aligned with the opening.

Preferably, this system includes at least one cover means mounted to the rotary launcher for covering the remaining portion of the opening when at least one of the plurality of missile mounting assemblies is aligned with the opening. The cover means cooperates with the plurality of doors to form a portion of the external contour extending completely over the opening. At least a portion of the cover means is mounted to at least one of the missile mounting assemblies.

The missile mounting assemblies preferably include at least one missile launch tube to which the missile is launchably mounted. Means are provided to move the assembly from a retracted position wherein, the cover means cooperates with the plurality of doors to form the portion of the external contour over the opening to an extended position wherein a missile may then be launched. If the rotary launcher is smaller than the opening remaining with the doors in the closed position, then a portion of the cover is mounted directly to the frame member.

While a cover means is necessary for maximizing the reduction in aerodynamic drag and radar cross-section, the remaining weapon mounting assemblies may comprise missile ejector assemblies instead of launch tubes. Here the missiles are forcibly ejected from the aircraft prior to the igniting of the missile motors.

The novel features which are believed to be characteristic of the invention both as to its organization and method of operation, together with further objects and advantages thereof, will be better understood from the following description in connection with the accompanying drawings in which presently preferred embodiments of the invention are illustrated by way of example. It is to be expressly understood, however, that the drawings are for purposes of illustration and description only and are not intended as a definition of the limits of the invention.

BRIEF DESCRIPTION OF THE DRAWING

Illustrated in FIG. 1 is a partial side elevation view of an aircraft incorporating the rotary missile launching system.

Illustrated in FIG. 2 is a view looking upward (bottom view) of the aircraft shown in FIG. 1 along the line 2—2.

Figure 3:
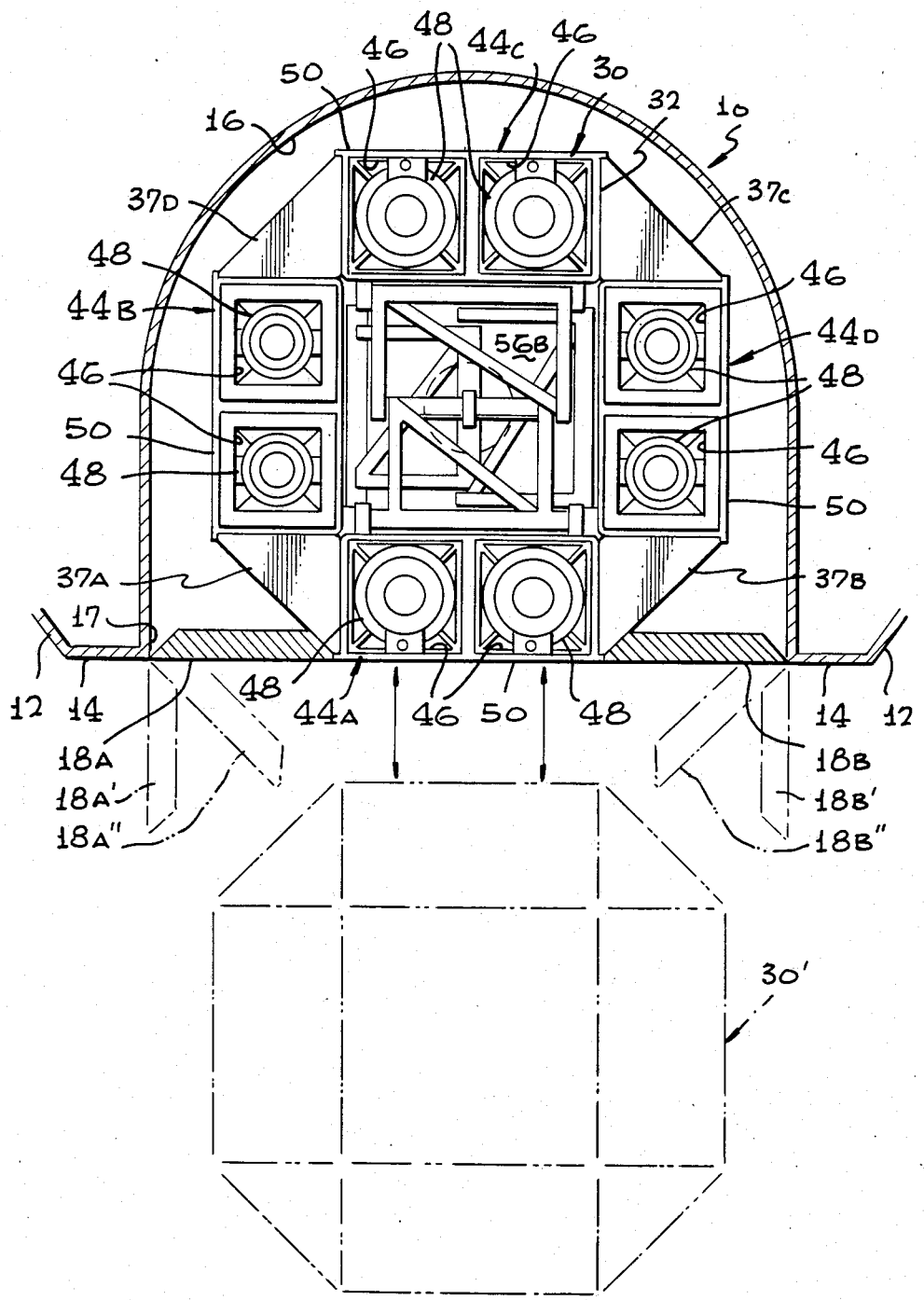

Illustrated in FIG. 3 is a cross-sectional view of the aircraft shown in FIG. 1 along the line 3—3.

Illustrated in FIG. 4 is a cross-sectional view similar to FIG. 3 showing missiles in the extended and ready-to-launch position.

Illustrated in FIG. 5 is a cross-sectional view similar to FIG. 3 showing a second embodiment of the invention.

BEST MODE FOR CARRYING OUT THE INVENTION

Referring to FIGS. 1 through 4 it can be seen that the aircraft, generally designated by numeral 10, has an external contour 12 which is substantially flat at the bottom or underside 14. This flat underside was selected for purposes of illustration and it must be understood that the bottom contour could be curved as dictated by aerodynamic or radar cross-section concerns. The aircraft 10 has an internal weapon bay 16 in communication with the exterior of the aircraft by means of opening 17. Side doors 18A and 18B and fore and aft doors 20A and 20B, respectively, are mounted about the opening 17 and are movable by actuators (not shown) from a closed position where they partially seal off the opening 17 and form a portion of the external contour 12 of the aircraft to an open position (indicated by numerals 18A', 18B', 20A' and 20B').

Mounted within the weapon bay 16 is a rotary launcher, generally indicated by numeral 30. The rotary launcher 30 comprises a hollow frame member 32 pivotally supported at its fore and aft ends 34A and 34B, respectively, by bearing mounts 36A and 36B, respectively. The frame member 32 further includes structural partitions or walls 37A, 37B, 37C, and 37D running longitudinally along the launcher. These partitions 37A, 37B, 37C, and 37D slidably engage the doors 18A and 18B to seal off the interior of the weapon bay 16 from radar signals and air turbulence. Thus in flight, the interior of the weapon bay 16 is sealed off so that the other missiles, and hydraulic and electrical systems will not be exposed to the high loads that can be induced by air turbulence. A drive motor 38 (either electric or hydraulically powered) is mounted at the aft end for rotating the launcher assembly 30. The rotary launcher 30 is detachably engaged with the bearing mounts 36A and 36B so that launcher assembly 30 can be lowered out of the weapon bay 16 through the opening 17 to a position below the aircraft indicated in dotted lines and numeral 30'. This can be easily accomplished by use of ground support equipment such as a simple hydraulic lift (not shown).

It should be noted that the fore and aft doors 20A and 20B are for gaining access to the bearing mounts 36A and 36B for securing the rotary launcher 30 in the aircraft. Thus, the coupling of the rotary launcher is automatic the length of the launcher can be extended eliminating the need for the fore and aft doors.

The aircraft is essentially of the "magazine loaded" type. The use of an easily removable launcher allows the sortie rate to dramatically increase, since a second launcher can be reloaded while the aircraft is still in the air. Additionally, the aircraft can easily be adapted for other missions, since, an entirely different set of missiles can be loaded in a second rotary launcher.

A plurality of weapon support assemblies 44A, 44B, 44C and 44D are mounted to frame member 32 at discrete intervals which are sequentially alignable with opening 17. The weapon support assemblies 44A, 44B, 44C and 44D are movable from a retracted position (FIG. 3) to an extended position (FIG. 4) when each individual assembly is aligned with the opening 17.

Each weapon mounting assembly comprises a pair of missile launch tubes 46. Each contain at least one folded fin missile 48. Attached thereto is a cover portion 50 which conforms to the external contour of the aircraft and which cooperates with the doors 18A, 18B, 20A and 20B to form that portion of the external contour covering the opening 17. It should be noted that if the launch tubes are small they might not extend across to the doors 18A and 18B, and may not have a length sufficient to reach the doors 20A and 20B, (for example, the missile assembly 52 indicated in dotted lines in FIG. 2). Thus, the portion thereabout would be part of the partitions 37A and 37B. But, in all cases, the cover portion 50 extends at least over a portion of the opening 17.

The assemblies 44A, 44B, 44C and 44D share identical actuating mechanisms indicated by numerals 56A and 56B respectively, which are mounted at right angles to each other within the frame member 32. The mechanism 56A comprises scissor linkages 58, 59 and 60, pivotally coupled at their ends 58A, 59A, and 60A to the assembly 44C and at their opposite ends 58B, 59B, and 60B to assembly 44A. The mechanism 56B comprises scissor linkages 61, 62 and 63 coupled by their ends 61A, 62A and 63A to assembly 44B and their opposite ends 61B, 62B and 63B to assembly 44D. A hydraulic cylinder 68 is pivotally coupled at one end to the center 58C of scissor linkage 58 and at its opposite end's pivotally connected to the center 61C of scissor linkage 61. A second hydraulic cylinder 70 is pivotally coupled at one end to the center 60C of scissor linkage 60 and its opposite end to the center 63C of scissor linkage 63. Thus to extend assembly 44A to position 44A', the hydraulic actuators 68 and 70 are retracted while the assemblies 44C and 44B and 44D are held in place by locking means (not shown). This will cause assembly 44A, when aligned with the opening 17 to extend, allowing the missile 48 to be launched from the tube 46. After the missiles are fired from assembly 44A it is retracted. The other assemblies 44B, 44C and 44D can be thereafter rotated into a position over the opening 17. This is accomplished by opening the doors 18A and 18B to the partially open position as indicated by 18A" and 18B" so that the frame member 32 is free to rotate.

Referring now to FIG. 5 which illustrates a second embodiment wherein a rotary missile launcher assembly indicated by numeral 71, is shown mounted in a fashion similar to rotary launcher assembly 30 as depicted in FIGS. 3 and 4. The rotary launcher 71 has a frame member 72 with weapon support assemblies 74A, 74B, 74C, and 74D. The weapon mounting assembly 74A, shown rotated to the three o'clock position, is similar to the assembly 44A having partitions 75A and 75B on either side thereof. The assemblies 74B, and 74D have missiles 80 mounted by in-line ejectors indicated by 82 (only one is hown per missile). These missiles are ejected from the aircraft and thereafter ignited. On the remaining assembly 74C missiles 80 are mounted in launch tubes 85 which are attached to in-line power cylinders 87 (only one is shown per missile). The cylinders 87 are designed to lower the tubes so that the front end is lowered down slightly more than the rear end for missile launching. Walls 90A and 90B provide the necessary barriers to the interior of the weapon bay. In this second embodiment, the assembly 74A is normally aligned with the opening 17 during flight to minimize drag and radar cross-section. When the other missiles are to be launched the launcher assembly 71 is rotated, the missiles fired and then the launcher assembly is rotated back to its original position with assembly 74A aligned with the opening.

This second embodiment allows the use of different types and sizes of missiles with both tube and ejector launching techniques. It would also have less weight because only one assembly need incorporate a cover to provide the smooth external contour necessary for drag and radar cross-section reduction. It should, however, be understood that all four weapon mounting assemblies could be ejector type or a mix of ejectors and in-line power cylinders. The partitions could still prevent air turbulence from reaching the weapon bay and the radar cross-section would still be lower than that of the conventional rotary launcher with doors open.

Thus, the major purposes of the invention are achieved.

1. The rotary launcher being removable from the aircraft turnaround time, i.e., sortie rate can be greatly increased for a fresh, fully loaded launcher, can be quickly installed.

2. Since the doors are only needed to be partially open when rotating the launcher the weapon bay is exposed to air tubulence for only very short periods during flight.

3. The radar cross-section of the aircraft even with a missile in a position to launch is not increased. The increased cross-sectional area only occurs during the lowering of the tubes and launching of the missiles. All the other previously mentioned purposes are likewise accomplished.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

Industrial Applicability

The invention has applicability to weapon carrying military aircraft.

We claim:

1. A rotary launcher system for an aircraft having a weapon bay, said weapon bay having an opening in communication with the exterior of the aircraft, the system comprising:
    a plurality of doors mounted on said aircraft movable from an open position to a closed position sealing off a portion of the opening and forming a portion of the external contour of the aircraft over the opening; and
    a rotary launcher comprising:
    a frame member rotatively mounted within the weapon bay;
    a plurality of weapon mounting assemblies mounted to said frame member at discrete locations thereabout and sequentially alignable with the opening upon rotation of said frame member, said weapon mounting assemblies adapted to mount at least one missile; and
    barrier means mounted to said frame member cooperating with said plurality of doors for sealing off the weapon bay from the exterior of the aircraft when any of said plurality of assemblies is aligned with the opening.

2. The system of claim 1 further including at least one cover means mounted to said rotary launcher for covering the remaining portion of the opening and cooperating with said plurality of doors to form the portion of the external contour over the opening, when at least one of said plurality of missile mounting assemblies is aligned with the opening.

3. The system of claim 2 wherein:
    said plurality of weapon mounting assemblies includes at least one missile launch tube for launchably mounting a missile;
    means to move said at least one assembly from a retracted position to an extended position wherein the missile can be launched from said at least one tube; and
    at least a portion of said at least one cover means is mounted to said at least one missile mounting assembly, such that when said at least one assembly is in the retracted position said at least a portion of said at least one cover means forms the remaining portion of the external contour over said opening.

4. The system of claim 3 wherein a portion of said remaining cover means is mounted to said frame member.

5. The system of claim 4 wherein less than all of said weapon mounting assemblies comprise means for mounting and ejecting at least one missile from the aircraft when said ejection means is aligned with the opening.

6. The system of claim 5 wherein said barrier means is a wall extending outward from said frame member and at least along each side of each of said weapon mounting assemblies such that the free end of said walls contact with said plurality of doors when said doors are in the closed position and one of said missile mounting assemblies is aligned with the opening.

* * * * *